(12) United States Patent
Anson et al.

(10) Patent No.: US 7,227,644 B2
(45) Date of Patent: Jun. 5, 2007

(54) FIBER OPTIC GYROSCOPE USING A NARROWBAND FBG FILTER AS A WAVELENGTH REFERENCE

(75) Inventors: Scott A. Anson, Glendale, AZ (US); Charles H. Lange, Glendale, AZ (US); Thomas C. Greening, Peoria, AZ (US)

(73) Assignee: Honeywell International, Inc., Morristown, NJ (US)

( * ) Notice: Subject to any disclaimer, the term of this patent is extended or adjusted under 35 U.S.C. 154(b) by 194 days.

(21) Appl. No.: 10/786,143

(22) Filed: Feb. 26, 2004

(65) Prior Publication Data

US 2005/0191008 A1    Sep. 1, 2005

(51) Int. Cl.
*G01C 19/72* (2006.01)
(52) U.S. Cl. ............................... 356/460; 385/12
(58) Field of Classification Search .......... 385/12–14, 385/31, 32, 39, 37; 372/6; 356/345, 350, 356/460–465; 250/227.19, 227.27
See application file for complete search history.

(56) References Cited

U.S. PATENT DOCUMENTS 6,025,915 A    2/2000 Michal et al.

6,108,086 A  * 8/2000 Michal et al. .............. 356/460
6,373,048 B1    4/2002 Tschanun

FOREIGN PATENT DOCUMENTS

| WO | WO97/24786 A | 7/1997 |
| WO | WO00/01044 A | 1/2000 |
| WO | WO00/40925 A | 7/2000 |

OTHER PUBLICATIONS

PCT International Search Report: PCT/US2005/005785, Applicant Reference No. H0003187-5704, Sep. 15, 2005, EP International Search Authority, 7 pages.

* cited by examiner

*Primary Examiner*—Hemang Sanghavi
(74) *Attorney, Agent, or Firm*—Ingrassia Fisher & Lorenz (57) ABSTRACT

Fiber optic gyroscope architectures that incorporate both (i) a WDM-based wavelength control and (ii) a wavelength reference based on a narrowband fiber Bragg grating (FBG), with the latter component providing significant improvement in the stability of the wavelength reference by calibrating out wavelength errors associated with a WDM-based wavelength control scheme.

22 Claims, 9 Drawing Sheets

FIBER OPTIC GYROSCOPE USING A NARROWBAND FBG FILTER AS A WAVELENGTH REFERENCE

This invention was made with Government support under contract no. N0030-01-C-0028 awarded by Draper Laboratories. The Government has certain rights in the invention.

BACKGROUND

1. Field of the Invention

The present invention relates generally to interferrometric fiber optic gyroscopes (IFOGs), and more particularly to control mechanisms for improving the stability of IFOGs.

2. Background of the Invention

Figure 1:
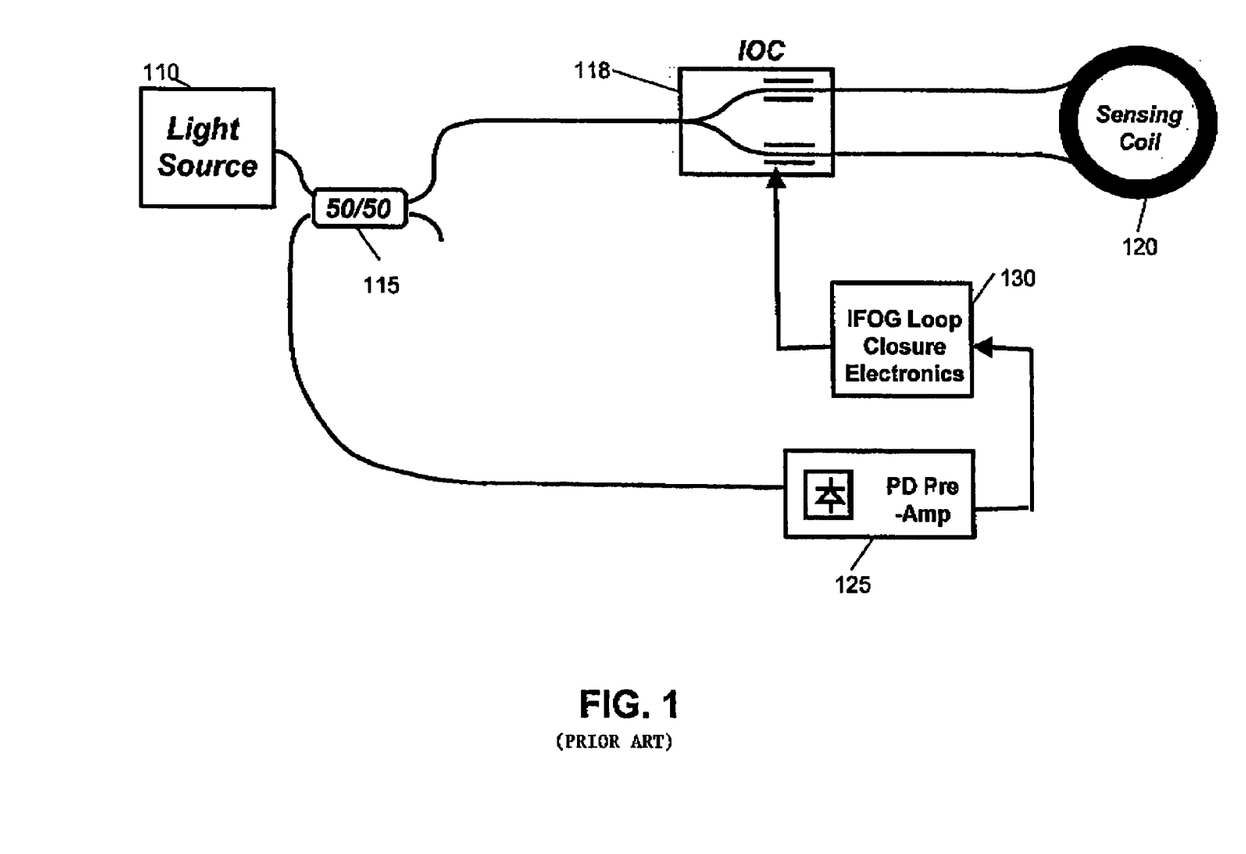
FIGS. 1 and 2 illustrate IFOG architectures according to the prior art.

The scale factor stability of an IFOG is highly dependent on the stability of the wavelength observed at the system photodetector. To improve IFOG performance, especially with respect to scale factor stability, IFOGs have been provided with a wavelength control scheme based on a wavelength division multiplexer (WDM) coupler, that acts as a wavelength discriminator, and a pair of matched photodiodes. More specifically, FIG. 1 shows a highly conventional IFOG architecture that includes a light source 110, such as a fiber light source, a 50—50 power splitter 115, and an integrated optics chip 118 that feeds light to and from a sensing coil 120, the latter two components sometimes being referred to herein as a "sensing loop assembly." Fifty-fifty coupler 115 is also connected to a photodiode and associated pre-amp 125 that is used to detected the Sagnac effect caused by rotation of sensing coil 120. IFOG loop closure electronics 130 bridge photodiode 125 and IOC 118 thereby providing desirable feedback, as is well-known.

Figure 2:
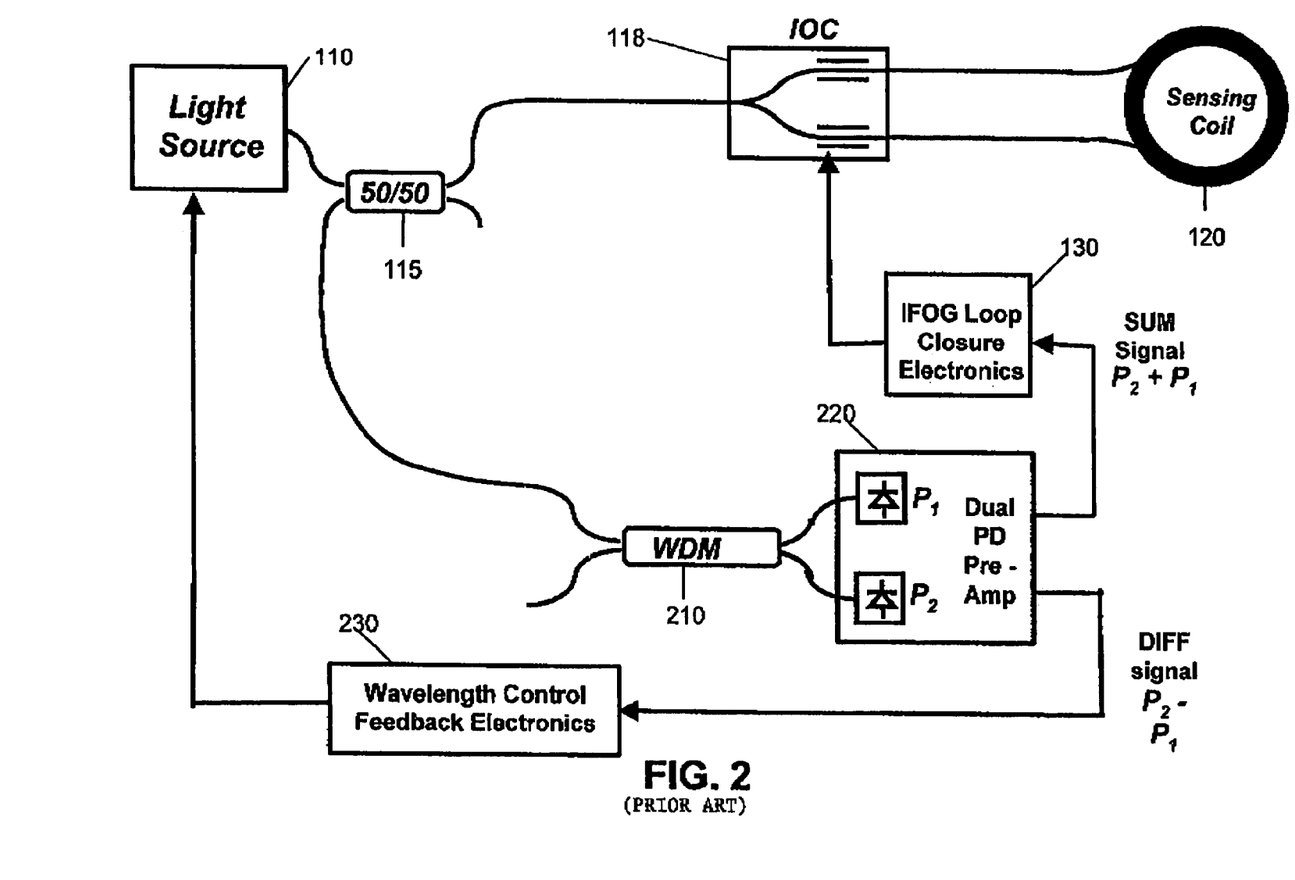

To improve upon the known system of FIG. 1, as mentioned, an architecture like that shown in FIG. 2 has recently been proposed. Here, a wavelength division multiplexer (WDM) coupler 210 along with a pair of matched diodes 220 is inserted in the optical circuit. This combination is sometimes referred to herein as a "wave division multiplexer/detector assembly." A signal representing the sum of the matched diodes is provided to IFOG loop closure electronics 130 and a differential signal is fed to wavelength control feedback electronics 230 to provide feedback directly to light source 110, and thereby provide improved wavelength stability for the light source itself.

Unfortunately, the wavelength stability of this system depends substantially on the stability of WDM coupler 210 and matched photodiodes 220, which may be subjected to external perturbations (e.g. temperature, radiation, etc.). These components may also be susceptible to long-term drift, thereby further degrading stability.

There is therefore a need for systems and methods that still further improve the wavelength stability of IFOG devices.

BRIEF SUMMARY OF THE INVENTION

The present invention provides an IFOG with improved wavelength stability, and thus better overall scale factor performance, by providing a stable wavelength reference that can be used to monitor changes in the wavelength control components. A particularly desirable by-product of having a stable wavelength is that it makes it possible to obtain a more stable scale factor.

More specifically, the present invention provides fiber optic gyroscope architectures that incorporate both (i) a WDM-based wavelength control and (ii) a wavelength reference based on a narrowband fiber Bragg grating (FBG), with the latter component providing significant improvement in the stability of the wavelength reference.

The several embodiments described herein propose several different architectures that employ a narrowband reflection fiber Bragg grating (FBG) that is used in conjunction with a source of light and a wave division multiplexer (WDM)/Detector assembly to provide improved stability.

The features and attendant advantages of the present invention will be more fully appreciated upon a reading of the following detailed description in conjunction with the accompanying drawings.

DETAILED DESCRIPTION OF THE INVENTION

Figure 3:
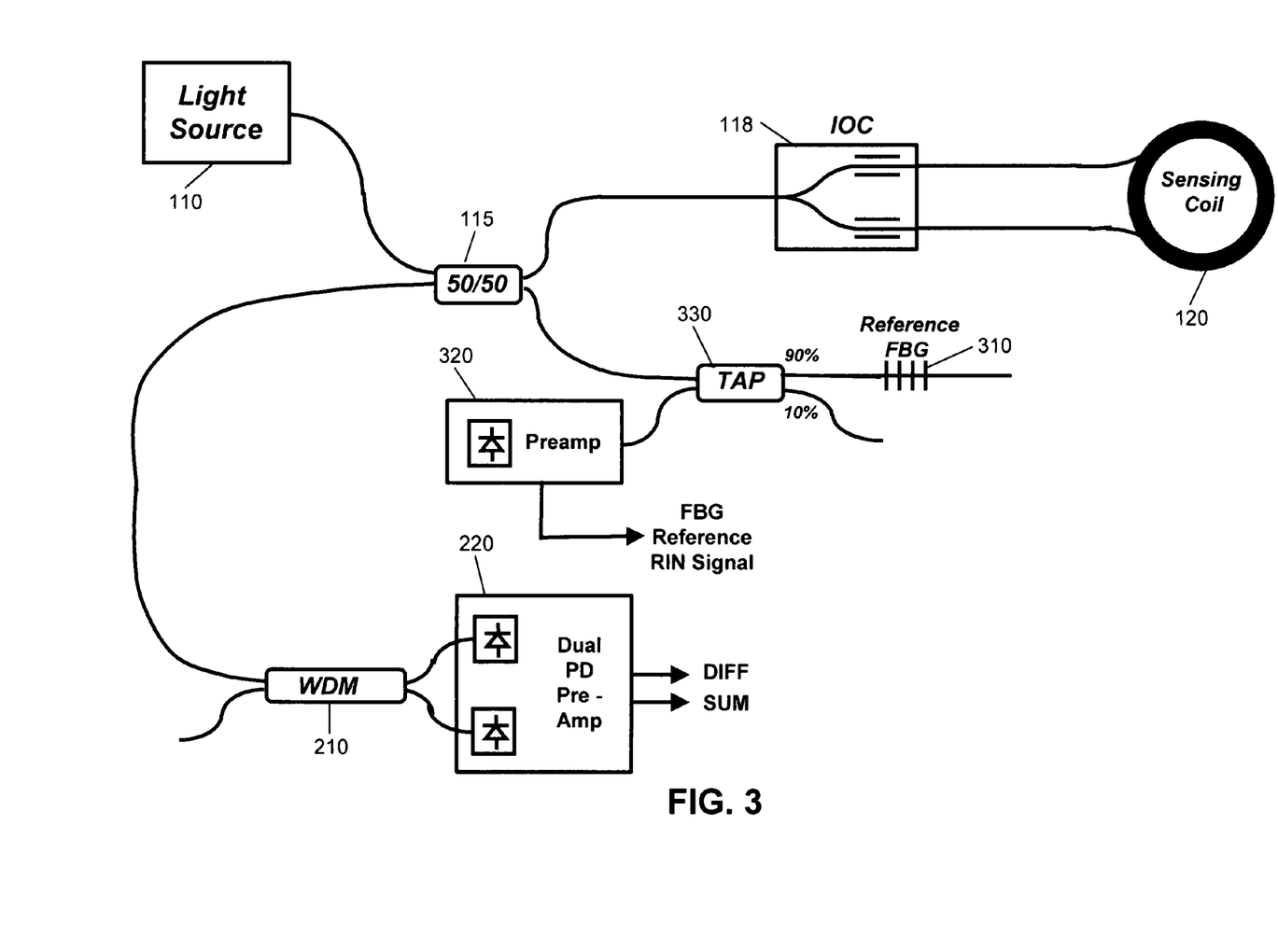
FIG. 3 depicts an IFOG architecture that incorporates a narrowband reflection fiber Bragg grating (FBG) in accordance with a first embodiment of the present invention.

FIG. 3 depicts an IFOG architecture that incorporates a narrow band reflection fiber Bragg grating (FBG) in accordance with a first embodiment of the present invention. In this, and other figures, the feedback lines (shown in FIGS. 1 and 2) are not shown for purposes of clarity. However, those skilled in the art will appreciate that a FOG in accordance with the several embodiments of the present invention will have such feedback lines. As shown, the architecture includes a light source assembly 110, such as a fiber light source that includes, for example, a 980 nm or 1480 nm laser pump, a wave division multiplexer (WDM) coupler, an erbium doped fiber, an isolator and an optical isolator. Such FLS assemblies are well-known in the art.

The output of light source 110, in this embodiment, is connected to a 50/50 power splitter 115. One port of splitter 115 is connected to an integrated optics chip (IOC) 118 and associated sensing loop 120. Another port of 50/50 splitter 115 is connected to WDM coupler 210, which is connected to matched photodiodes 220. In accordance with this embodiment, a fourth port of 50/50 splitter 115 is connected to a tap 330 having, for example, 90% and 10% ports. In this case, the 90% port is connected to a fiber Bragg grating (FBG) 310 that acts as a narrow band reflection FBG that is used to create a narrow wavelength reference from the broadband light source spectrum.

Figures 9, 10A, 10B:
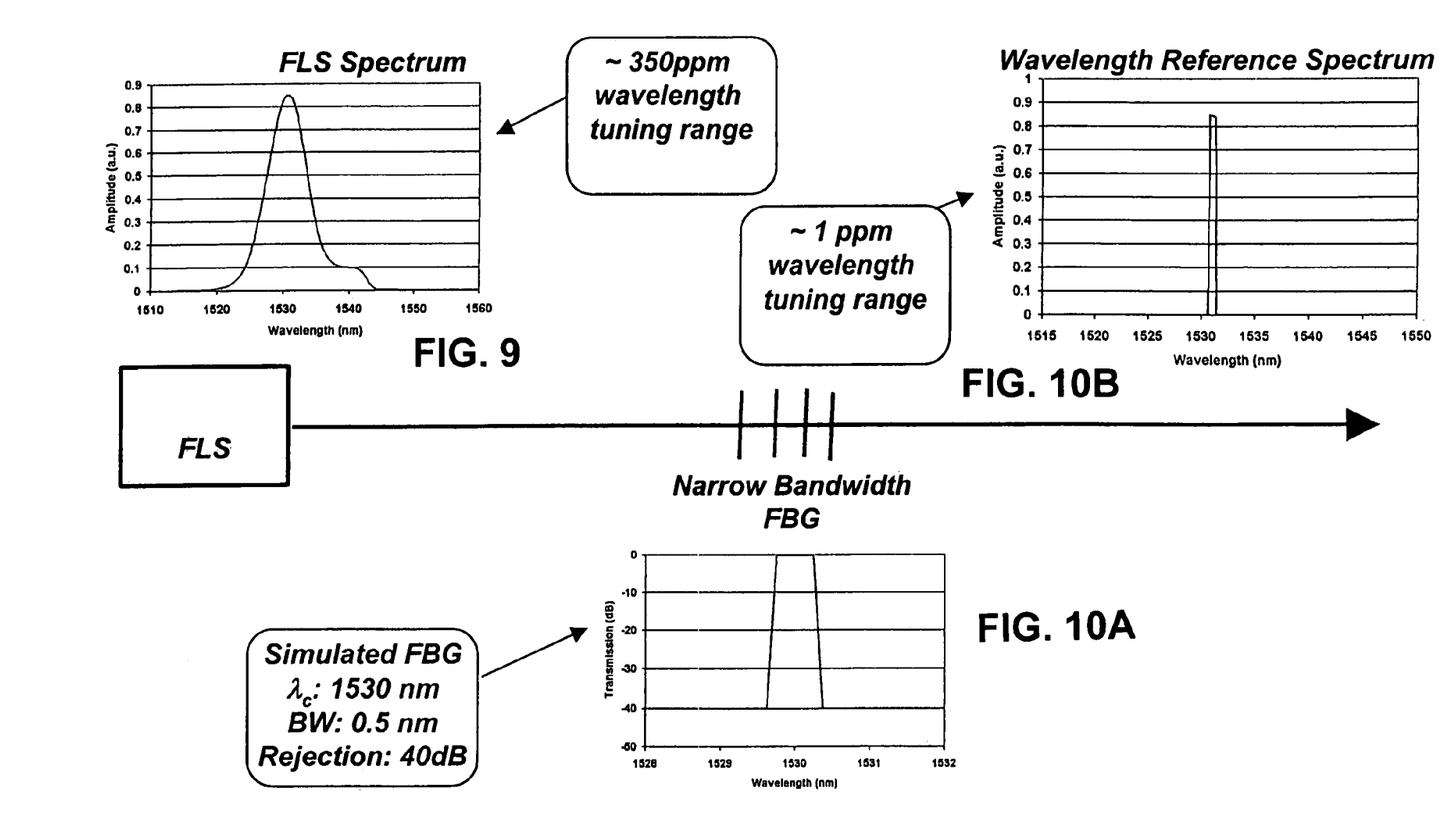
FIG. 9 illustrates a typical fiber light source (FLS) frequency spectrum.
FIGS. 10A and 10B depict, respectively, the bandwidth of a narrow bandwidth FBG that can be employed in the inventive architectures, and the resulting wavelength reference spectrum when such a narrowband FBG is applied to an output of the FLS.

FIG. 9 illustrates a typical output spectrum of a 1532 nm fiber light source (FLS) that can be employed for light source 110. As indicated, a tunable range of about 350 ppm is readily achievable by tuning the input current over its full range.

Further, as shown by FIGS. 10A and 10B, if a narrow bandwidth fiber Bragg grating (FBG) having a center wavelength of about 1530 nm and a bandwidth of about 0.5 nm, along with a rejection of about 40 dB (illustrated by FIG. 9A), is inserted in the light path that is to be used as a wavelength reference, then the spectrum passing back through 50/50 splitter 115 is like that shown in FIG. 10B. Because of the very narrow bandwidth, an extremely stable wavelength, on the order of 1 ppm, can be achieved even when the input current to the light source is tuned over its full range. Those skilled in the art will appreciate that the center wavelength, bandwidth, and rejection of the FBG can be optimized for different light sources and stability requirements and the particular wavelength, bandwidth and rejection values noted herein are exemplary only.

Ultimately, and in accordance with the present invention, the wavelength reference provided by FBG 310 is used to calibrate the WDM coupler 210 and photo diodes 220. The WDM coupler acts as a wavelength discrimator, i.e. it splits the longer and shorter wavelengths components of the light between its two output ports. The photodetectors measure the total power at each of the output ports of the WDM coupler. A change in the input wavelength will change the power split between these two ports. Therefore, the ratio of the DIFF signal (P2−P1) to the SUM signal (P2+P1) can be used to monitor this wavelength shift.

If one assumes that the WDM coupler and photodetectors are perfectly stable, then a change in this ratio is an indication of a wavelength shift. However, if the center wavelength of the WDM coupler and/or the responsivity of the photodetectors changes over time this will also cause a change in the ratio even though the mean wavelength of the input light does not change. The stable wavelength reference provide by the FBG is used to measure the shift in the center wavelength of the WDM coupler. When used in conjuction with a 2×1 switch (as shown, for example, in FIG. 4) it can also compensate for the differential change in the photodetector responsitivities as well. In this way, one can distinguish changes in the input wavelength from changes in the WDM coupler center wavelength and the photodetector differential responsitivity.

Preferably, a photodetector/preamplifier 320 is provided to amplify the reference signal that is provided by wavelength reference FBG 310. The wavelength reference will have its own relative intensity noise (RIN) which is added to the IFOG signal at the 50/50 coupler 115 before it enters the WDM coupler 210. This noise can degrade the IFOG Angle Random Walk performance unless it is compensated for. The FBG Reference RIN signal can be used to remove the added noise from the wavelength reference in the SUM signal which is used to close the IFOG loop. Note that this FBG Reference Signal is not needed if a switch is used to turn off the wavelength reference signal as shown in FIG. 4.

More specifically, tap 330 and photodetector/preamplifier 320 are employed to compensate for RIN noise at matched or dual photo detectors 220 that is induced by the narrow band reference.

In an alternative embodiment, wavelength reference FBG 310 can be replaced with a different type of wavelength selective filter to create a wavelength reference. One possibility is to use a molecular reference such as an acetylene cell. It should be understood that while the potential wavelength stability of a molecular reference is much greater (~2 orders of magnitude) than an FBG based wavelength reference, an advantage of the FBG architectures described herein is that they are much less complicated to implement.

Figure 4:
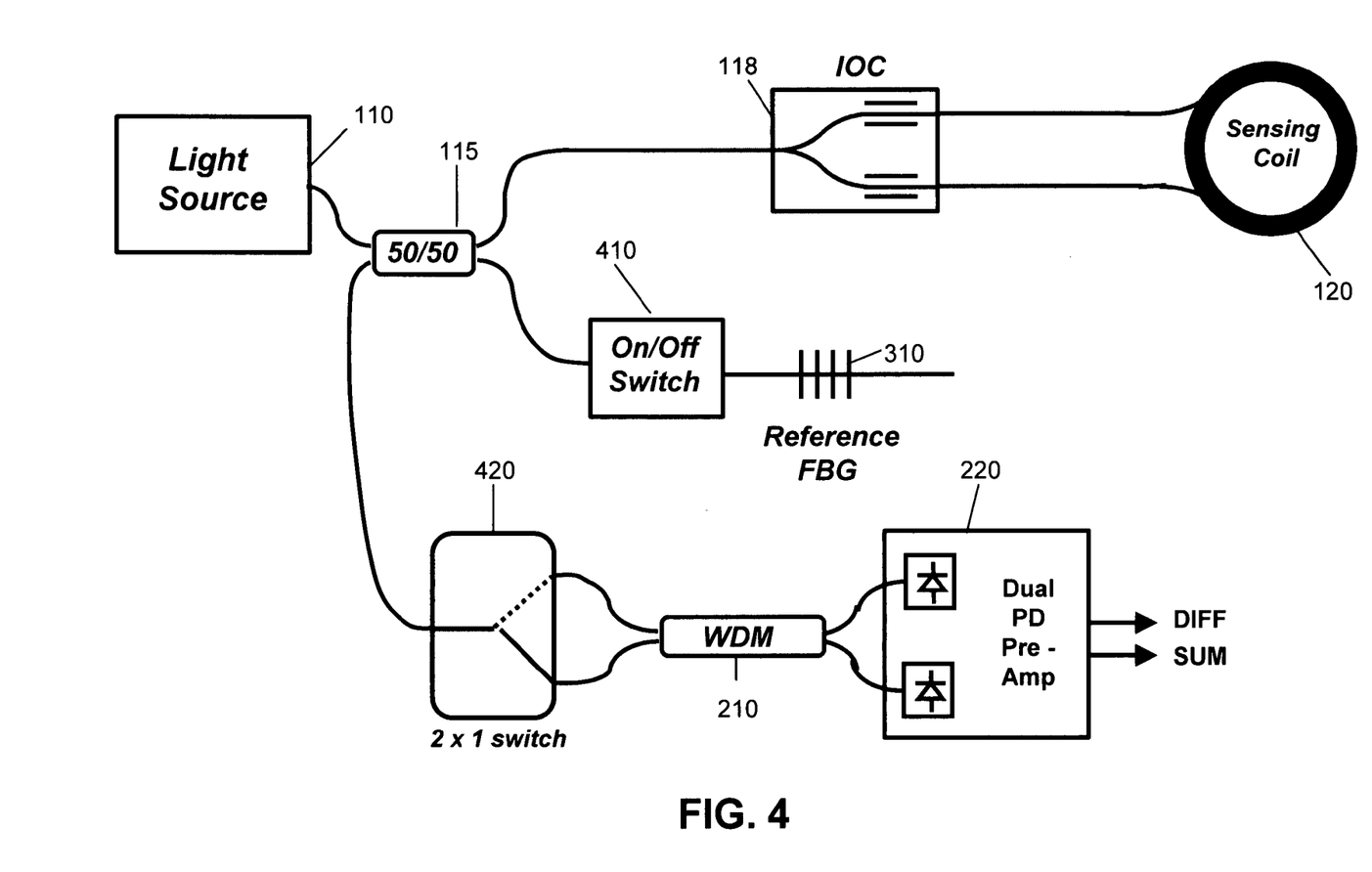
FIG. 4 depicts an IFOG architecture that incorporates a narrowband fiber Bragg grating (FBG) and switches in accordance with a second embodiment of the present invention.

FIG. 4 shows a second embodiment of the present invention in which an on/off switch 410 is employed to turn wavelength reference FGB 310 on and off, thereby effectively replacing tap 330 and additional photo diode and preamplifier 320. With switch 410 in an ON position the desired narrowband reference is supplied to WDM coupler 210 and matched photo diodes 220. In addition, an optional 2×1 switch 420 can be used to switch input legs of WDM coupler 210 to eliminate photo detector responsivity sensitivities.

Figure 5:
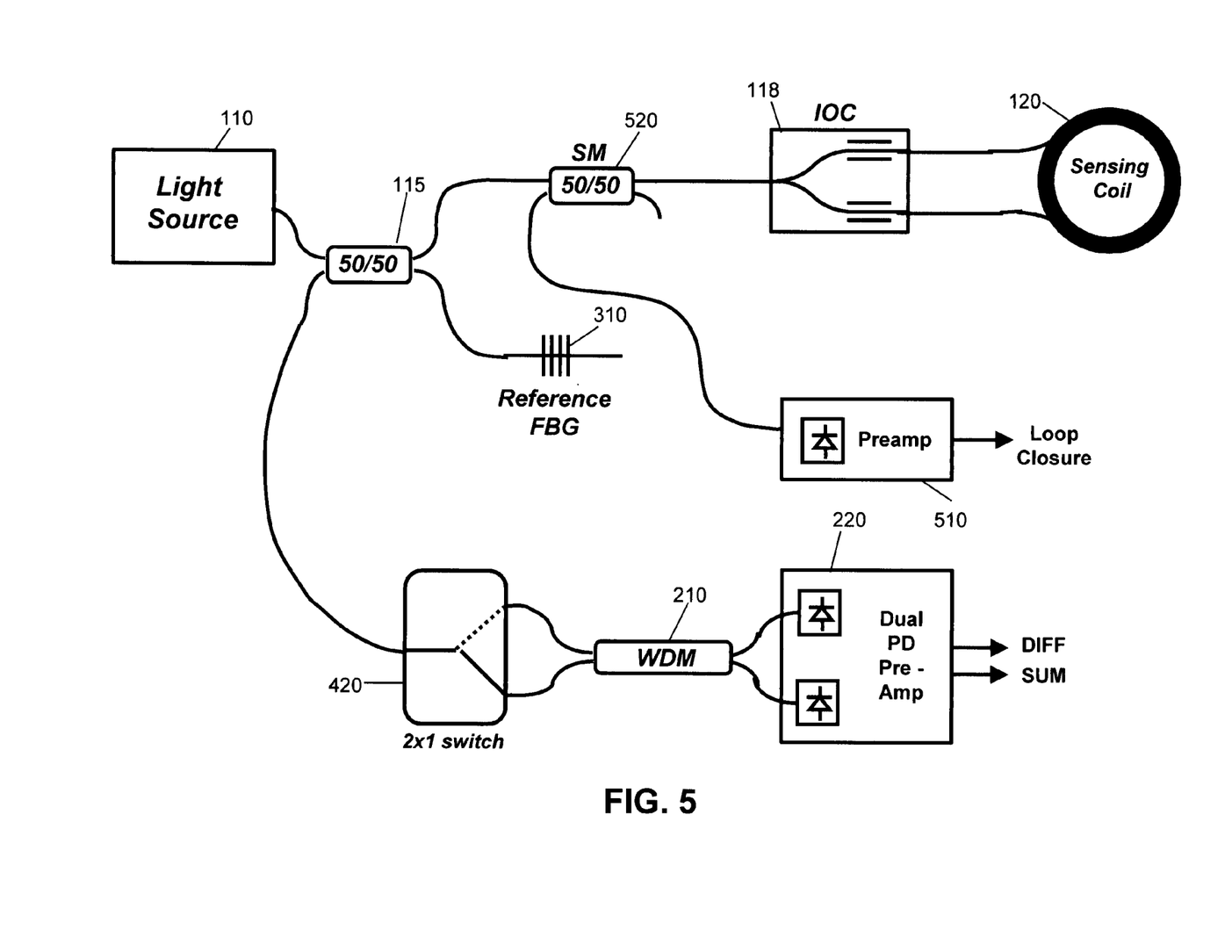
FIG. 5 depicts an IFOG architecture that incorporates a narrowband fiber Bragg grating (FBG) and a separate photodiode to close the FOG loop in accordance with a third embodiment of the present invention.

FIG. 5 illustrates a third embodiment of the present invention that is similar to the first embodiment, but here includes a separate photo diode and pre amp 510 that is used for loop closure. A second 50/50 coupler 520 is employed to tap the light signal returning from IOC 118. Here, of course, wavelength reference FBG 310 is still employed, consistent with the principles of the present invention. It is noted that the optical switch 410 of the second embodiment is no longer necessary because of the separate loop closure photo diode 510.

Figure 6:
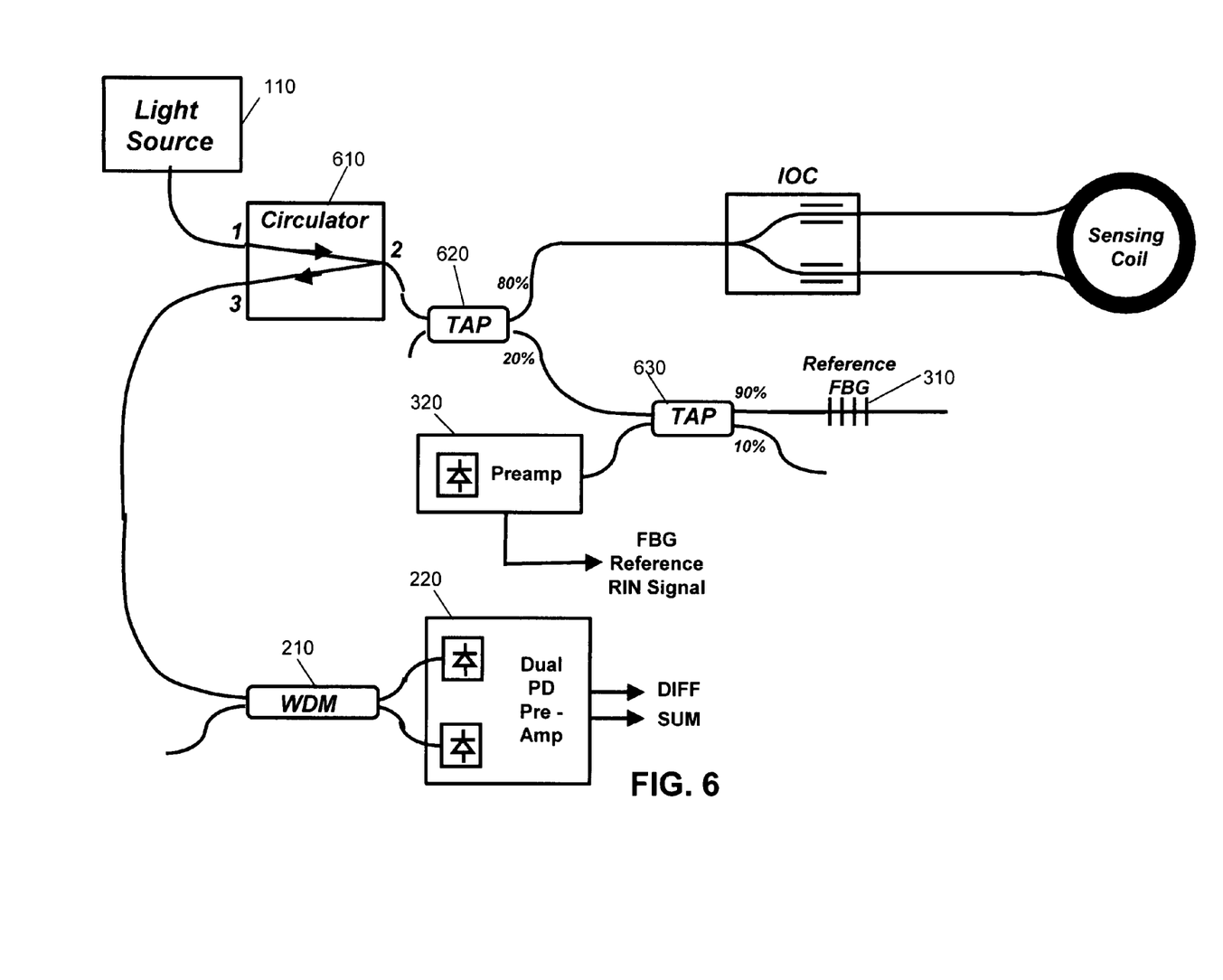
FIG. 6 depicts an IFOG architecture that incorporates a narrowband fiber Bragg grating (FBG) and circulator in accordance with a fourth embodiment of the present invention.

FIG. 6 shows yet another embodiment of the present invention in which a circulator 610 is used instead of a 50/50 splitter as was shown in the first three embodiments. Here, wavelength reference FBG 310 is connected to photo diode and pre-amplifier 320 via tap 630 (here shown having 90% and 10% ports). Light source 110 is in communication with wavelength reference FGB 310 via tap 620 (here shown with 80% and 20% ports) and tap 630. As before, narrowband reflection FBG 310 is used to create a narrow wavelength reference from broadband light from light source 110. This wavelength reference is then used to calibrate WDM coupler 210 and matched photo diodes 220 consistent with the overriding goal of the present invention. In accordance with this embodiment, and as before, tap 630 and photo diode/preamplifier 320 are employed to compensate for RIN noise at the dual photo detectors induced by the narrowband reference. Those skilled in the art will appreciate that tap split ratios other than those illustrated can be used.

Figure 7:
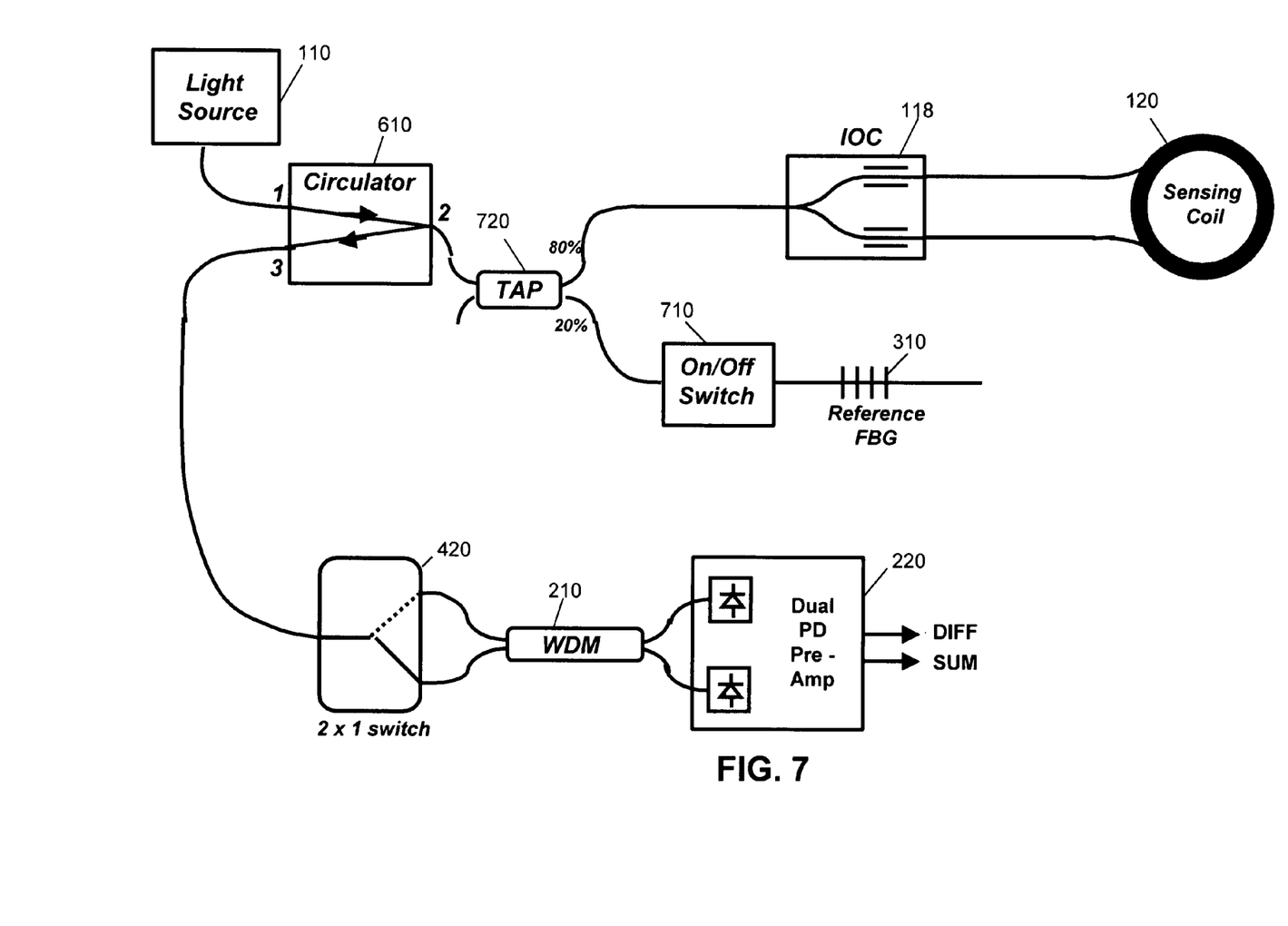
FIG. 7 depicts an IFOG architecture that incorporates a narrowband fiber Bragg grating (FBG), circulator and switches in accordance with a fifth embodiment of the present invention.

FIG. 7 shows a fifth embodiment of the present invention that employs a switch 710 to turn wavelength reference FBG 310 on/off. Wavelength reference FBG 310 is connected to circulator 610 via a tap 720. As before, split ratios other than the ones shown can be implemented. Also, it should be pointed out that tap 720 and circulator 610 replace 50/50 splitter 115, like that shown in FIG. 1. This may be significant since double pass loss of a 50/50 splitter is 6 dB, while loss of a circulator/tap coupler pair is about 3 dB, depending on the tap split ratio.

As in other embodiments, this fifth embodiment may also optionally include a 2×1 switch 420 to switch input legs of WDM coupler 210 to eliminate photo detector responsivity sensitivities.

Figure 8:
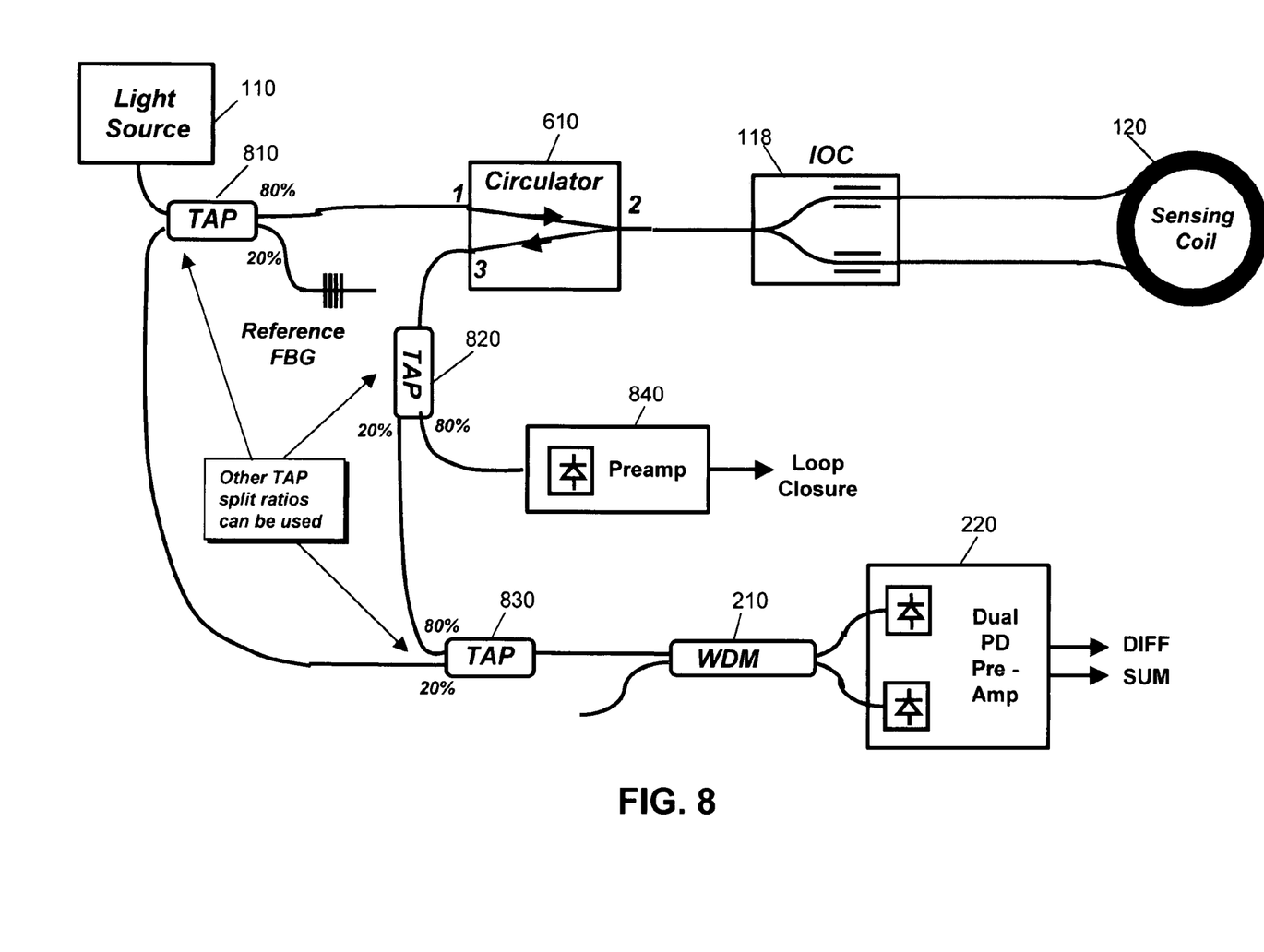
FIG. 8 depicts an IFOG architecture that incorporates a narrowband fiber Bragg grating (FBG), circulator and a separate photodiode to close the FOG loop in accordance with a second embodiment of the present invention.

Finally, FIG. 8 depicts a sixth embodiment of the present invention that employs a circulator 610 and three taps 810, 820 and 830 to implement a separate loop closure photo detector 840. Thus here, like in other embodiments, a switch is unnecessary to obtain the narrowband reference signal generated by wavelength reference FGB 310.

As will be appreciated from the foregoing, the present invention is directed to adding a wavelength reference to an overall IFOG architecture that can be used to calibrate out wavelength errors associated with a WDM-based wavelength control scheme.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. An interferrometric fiber optic gyro (IFOG), comprising:
   a light source;
   a sensing loop assembly in communication with the light source;
   a wave division multiplexer/detector assembly in communication with the light source that is used for wavelength control; and
   a narrowband fiber Bragg grating (FBG) not associated directly with the light source and in communication with the light source and the wavelength division multiplexer/detector assembly to compensate for errors in the wavelength division multiplexer/detector assembly and such that at least a portion of light from the light source enters the wave division multiplexer/detector assembly without impinging upon the narrowband FBG.

2. The IFOG of claim 1, wherein the narrowband FBG is a reflection FBG.

3. The IFOG of claim 1, wherein the narrowband FBG is in communication with the light source via a splitter.

4. The IFOG of claim 1, wherein only a single splitter is employed to provide light, which is subjected to the narrowband FBG, to the wave division multiplexer/detector assembly.

5. The IFOG of claim 4, wherein the single splitter is a 50/50 splitter.

6. The IFOG of claim 4, wherein the 50/50 splitter is disposed between the fiber light source and the sensing loop assembly.

7. The IFOG of claim 1, wherein a plurality of splitters are employed to provide light, which is subjected to the narrowband FBG, to the wavelength division multiplexer/detector assembly.

8. The IFOG of claim 1, further comprising a first switch to switch the narrowband FBG in and out of an optical circuit.

9. The IFOG of claim 8, further comprising a second switch to switch an input to the wavelength division multiplexer/detector assembly.

10. The IFOG of claim 1, further comprising a circulator disposed between the light source and the narrowband FBG.

11. An interferrometric fiber optic gyro (IFOG), comprising:
    a light source;
    a sensing loop assembly in communication with the light source via a first and a second splitter;
    a wavelength division multiplexer/detector assembly, which is used for wavelength control, in communication with the light source via the first splitter;
    a photodetector, for detecting a Sagnac effect resulting from rotation of at least a sensing loop of the sensing loop assembly, in communication with the sensing loop assembly via the second splitter; and
    a narrowband reflection fiber Bragg grating (FBG) in communication with at least the fiber light source and the wave division multiplexer/detector assembly via the first splitter and such that at least a portion of light from the light source enters the wave division multiplexer/detector assembly without impinging upon the narrowband reflection (FBG).

12. The IFOG of claim 11, wherein the first splitter is a 50/50 splitter.

13. The IFOG of claim 11, wherein the second splitter is a 50/50 splitter.

14. The IFOG of claim 11, wherein the reflection FBG has a bandwidth of about 0.5 nm.

15. An interferrometric fiber optic gyro (IFOG), comprising:
    a light source;
    a sensing loop assembly in communication with the light source via a circulator and a tap coupler,
    a wavelength division multiplexer/detector assembly, which is used for wavelength control, in communication with the light source via the circulator, the wavelength division multiplexer/detector assembly comprising a pair of matched photodiodes that are arranged to deliver sum and differential signals; and
    a narrowband reflection fiber Bragg grating (FBG) in communication with the tap coupler such that the narrowband reflection FBG is optically coupled to both the light source and the wavelength division multiplexer/detector assembly and such that at least a portion of light from the light source enters the wave division multiplexer/detector assembly without impinging upon the narrowband reflection (FBG).

16. The IFOG of claim 15, further comprising a switch to switch the narrowband reflection FBG in and out of an optical circuit.

17. The IFOG of claim 15, wherein the tap coupler has 80% and 20% ports.

18. The IFOG of claim 17, wherein the sensing loop assembly is connected to the 80% port.

19. The IFOG of claim 15, wherein the narrowband reflection FBG has a bandwidth of about 0.5 nm.

20. An interferrometric fiber optic gyro (IFOG), comprising:

a light source optically coupled to a sensing loop assembly via a first tap coupler and a circulator;

a second tap coupler optically coupled to the first tap coupler a third tap coupler and a wavelength division multiplexer/detector that is used for wavelength control;

the second tap coupler further being optically coupled to the circulator and a photodiode that is operable to detect a Sagnac effect resulting from rotation of at least a sensing loop of the sensing loop assembly; and a narrowband reflection fiber Bragg grating (FBG) in communication with the first tap coupler such that the narrowband reflection FBG is optically coupled to both the light source and the wavelength division multiplexer/detector assembly and such that at least a portion of light from the light source enters the wave division multiplexer/detector assembly without impinging upon the narrowband reflection (FBG).

21. The IFOG of claim 20, wherein the narrowband FBG has a bandwidth of about 0.5 in.

22. An interferrometric fiber optic gyro (IFOG), comprising:

a light source;

a sensing loop assembly in communication with the light source;

a wavelength division multiplexer/detector assembly in communication with the light source that is used for wavelength control; and a narrowband fiber Bragg grating (FBG) not associated directly with the light source and in communication with the light source and to compensate for errors in the wavelength division multiplexer/detector assembly and such that at least a portion of light from the light source enters the wave division multiplexer/detector assembly without impinging upon the narrowband FBG.

* * * * *